United States Patent

Daubinger et al.

[11] Patent Number: 6,126,368
[45] Date of Patent: Oct. 3, 2000

[54] ROTARY TOOL WITH A COOLING APPARATUS

[75] Inventors: Gerd Daubinger; Horst Rahmsdorf, both of Munich; Felix Ferlemann, Windach; Frank Brandenburg; Holger Wirtz, both of Aachen, all of Germany

[73] Assignee: Hilti Aktiengesellschaft, Schaan, Liechtenstein

[21] Appl. No.: 09/281,252

[22] Filed: Mar. 30, 1999

[30] Foreign Application Priority Data

Apr. 1, 1998 [DE] Germany ............................ 198 14 470

[51] Int. Cl.[7] .................................................. B23B 45/00
[52] U.S. Cl. ................................................. 408/61; 408/56
[58] Field of Search .................................. 408/56, 60, 61

[56] References Cited

U.S. PATENT DOCUMENTS

| | | |
|---|---|---|
| 2,381,650 | 8/1945 | Dick . |
| 2,437,605 | 3/1948 | Karge . |
| 3,413,875 | 12/1968 | Larson ....................................... 408/61 |
| 3,547,350 | 12/1970 | Marcoux ................................... 408/61 |
| 3,583,383 | 6/1971 | Ovshinsky ................................ 408/56 |
| 4,708,539 | 11/1987 | Threadgill . |
| 5,890,848 | 4/1999 | Kachich .................................... 408/61 |
| 5,951,216 | 9/1999 | Antoun ..................................... 408/56 |

FOREIGN PATENT DOCUMENTS 1042954  9/1983  U.S.S.R. ................................. 408/61

*Primary Examiner*—Daniel W. Howell
*Attorney, Agent, or Firm*—Brown & Wood, LLP

[57] ABSTRACT

A rotary tool for imparting rotation to a drill or an attachment element (2), and including a rotation-imparting element (14), and apparatus (6) for storing a cooling medium, and a conduit (7) for delivering the cooling medium to an operational side end region of the drill or of the attachment element (2).

6 Claims, 1 Drawing Sheet

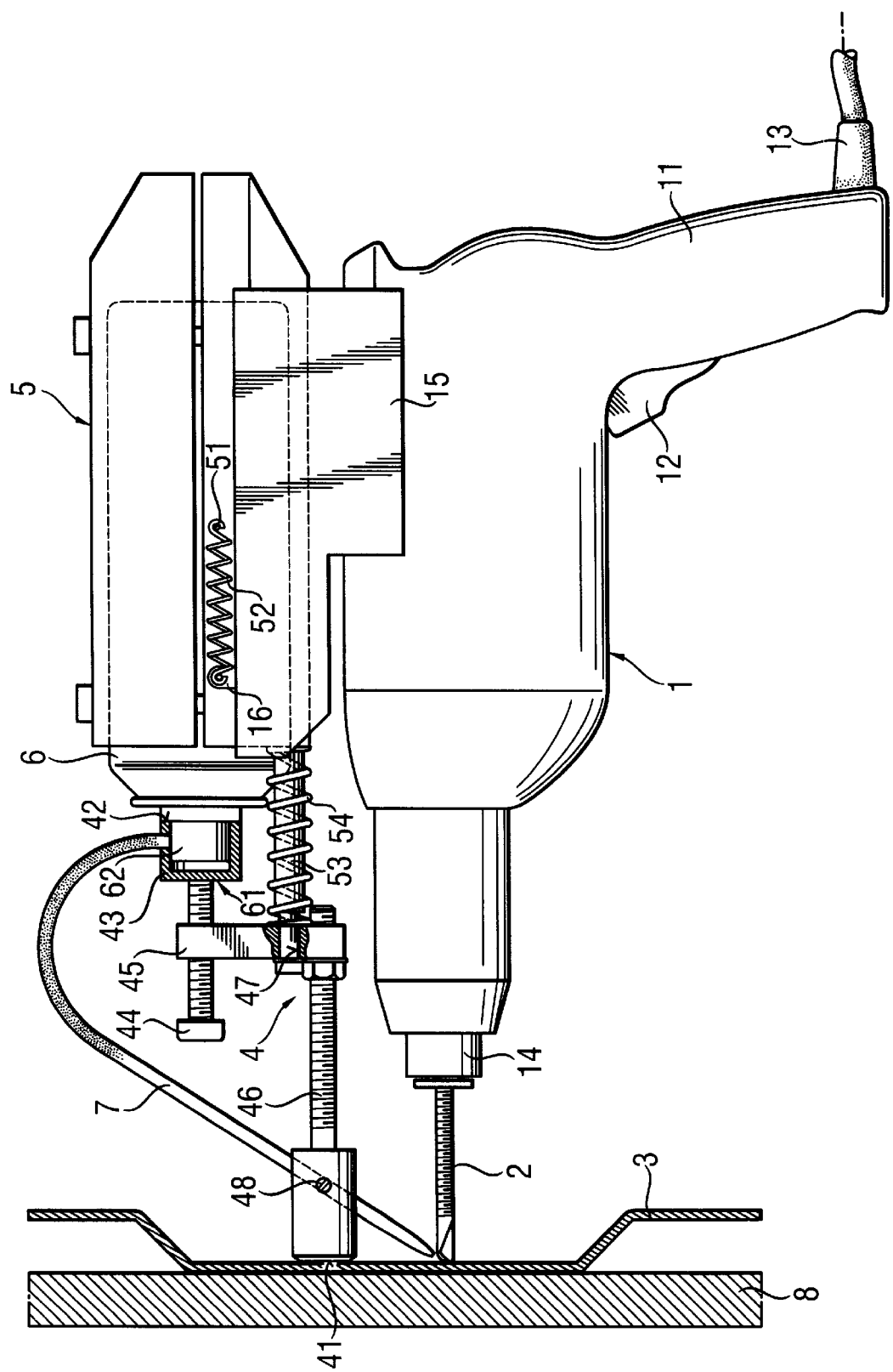

ROTARY TOOL WITH A COOLING APPARATUS

BACKGROUND OF THE INVENTION

1. Field of the Invention

The present invention relates to a rotary tool for imparting rotation to a drill or the attachment element.

2. Description of the Prior Art

For securing a constructional part, which is formed, e.g., of a thin-wall metal piece, to a constructional component formed, e.g., of wood, a through-hole should be formed in the constructional part through which an attachment element can extend before it is secured in the constructional component. The through-hole in the constructional part can be formed, e.g., by the drilling head of a drill or of the attachment element, with the rotation being imparted to the drill or the attachment element by the rotary tool.

In order to be able to form a through-or receiving hole in the constructional part in a very short time with a small pressure applied to the rotary tool, in the past, the drill or the attachment element was driven with a very high rotational speed. The high rotational speed resulted in a sharp raise of the temperature in the working location which led to change in the mechanical properties of the material of the constructional component in this location, and drilling with the drill or the attachment element, in this location, was not any more possible. Instead, a very high friction was developed between the drilling head of the drill or the attachment element which resulted in burning of the drilling head and, thus, in the damage of the drill or the attachment element.

Accordingly, an object of the present invention is to provide a rotary tool for imparting rotation to a drill or an attachment element with which the damage of the drill or the attachment element, in particular, as a result of burning during the formation of a through-or receiving hole in a constructional part, will be prevented.

SUMMARY OF THE INVENTION

This and other objects of the present invention, which will become apparent hereinafter, are achieved by providing a rotary tool for imparting rotation and including a rotation-imparting element, an apparatus for storing a cooling medium, and a conduct for delivering the cooling medium to an operational side end region of the drill or of the attachment element.

The cooling medium cools, during the formation of a through-or receiving hole in the constructional part, the heated drilling head of the drill or the attachment element so that, despite a high friction between the drill or the attachment element and the constructional part, burning of the drilling head is prevented. Because the cooling medium also cools the surface of the constructional part in the region of the working location, the original mechanical properties of the material of the constructional component are not altered, and machining of the through-or receiving hole can be effected until the hole is formed. Due to the use of the cooling medium, the drill or the attachment element can be driven with a high rotational speed. Therefore, the hole can be formed in a short time and with a small pressure applied to the rotary tool.

To provide for an easy and reliable delivery of the cooling medium, a valve is used for controlling the cross-section of the outlet opening of the cooling medium storing apparatus. Advantageously, control means, which cooperates with the valve, is provided. Providing control means permits to eliminate manual actuation of the valve during the formation of the through-or receiving hole in the constructional part. As the control means, an electrical or electromagnetic device can be used the power supply of which is actuated, e.g., with the trigger of the rotary tool. The beginning, the duration, or the end of the power supply can be controlled by an electrical control element.

In order to provide for control of the valve in accordance with the rotary tool movement in the operational direction, the control means can be formed as a unit displaceable in a direction relative to the rotary tool housing against a biasing force of a spring and having a stop surface facing the operational direction and a control profile cooperating with the valve.

An exact control of the outlet cross-section is effected, advantageously, with an adjusting element of the control valve and which is displaced by the control profile of the control unit by an angle from 0° to 90° relative to the operational direction.

For manufacturing reasons, the storing apparatus and the valve are formed as a unit.

As a cooling medium, a medium, which is gaseous under the atmospheric pressure, is used. The storage of the cooling medium in the apparatus takes place under a high pressure, which results in the liquefaction of the gaseous cooling medium. For safety reasons, advantageously, the apparatus is formed as a pressure vessel.

For a quick replacement of the empty storing apparatus, advantageously, the storing apparatus is releasably connected with the rotary tool housing.

To facilitate handling, the delivering conduit is formed as a flexible tubular conduit.

The drill can be provided with heat-insensitive cutting elements, e.g., diamonds.

BRIEF DESCRIPTION OF THE DRAWINGS

The features and objects of the present invention will become more apparent, and the invention itself will be best understood from the following detailed description of the preferred embodiment when read with reference to the accompanying drawings, wherein:

Single FIGURE shows a schematic view of a rotary tool according to the present invention.

DETAILED DESCRIPTION OF THE PREFERRED EMBODIMENT

A rotary tool, which is shown in the drawing, can be formed, e.g., as a screw driving tool which produces a rotational movement necessary for screwing-in of a screw. The screw driving tool shown in the drawing includes a rotary head, which can be formed, e.g., as a driving screw acting on an attachment element 2. The screw driving tool shown in the drawing includes a housing 1, a handle 11, a trigger 12, an electrical connection cable 13, a rotatable spindle 14 and a guide 15 fixedly connected with the housing 1.

The front, in the operational direction, end of the spindle 14 is connected with the attachment element 2 the drilling head of which engages the surface of a constructional part 3 formed of a thin metal. A section of the attachment element 2, which adjoins its drilling head, has an outer thread. The threaded section ends with a large-surface head. The drilling head and the threaded section form together the stem of the attachment element 2. The constructional part 3 abuts, e.g., a constructional component 8 made, e.g., of wood, and is attachable to the constructional component 8 with the attachment element 2.

The guide 15, which is connected with the tool housing 1 is used for supporting a carrier member 5 in which an apparatus 6, which is formed, e.g., as a pressure vessel for storing a cooling medium, is secured. The carrier member 5 is displaceable, in a direction opposite to the operational direction of the tool, against a biasing force of a spring 52. The displacement path of the carrier member 5 substantially corresponds to the length of the stem of the attachment element 2. The spring 52 cooperates with a first entrained member 16 of the guide 5 and a second entrained member 51 of the guide 5.

The pressure vessel 6 for storing the cooling medium has a valve 61 which projects, in the operational direction, beyond the carrier member 5. The adjusting element 62 of the valve 61 is covered with a pressure member 43. The pressure member 43 rotates relative to the first adjusting screw 44 and has, at its side opposite to the operational direction, a control profile 42. The adjusting screw 44 extends through an opening formed in a connection member 45 which is formed as a yoke. The adjusting screw 44 has, at its end facing in the operational direction, a head which can be formlockingly engaged with a tool for rotating the adjusting screw 44.

The connection member 45 has a second opening through which a second adjusting screw 46 extends. The second adjusting screw 46 has, at its end facing in the operational direction, a head having a stop surface 41 facing in the operational direction and an inclined through-hole through which a delivery conduit 7, which cooperates with the valve 61 extends.

The delivery conduit 7 is held in the inclined through-hole of the head of the second adjusting screw 46 with a locking screw 48. The delivery conduit 7 is formed as a thin, partially flexible tubular conduit. The two openings which are formed in the connection member 45 and through which the first and second adjusting screws 44 and 46 extend, have an inner thread corresponding to the outer thread of the adjusting crews 44 and 46. The adjusting screws 44 and 46 are provided with lock nuts which provide for securing of the adjusting screws 44 and 46 to the connection member 45 by deforming the threaded connection. The pressure member 43, the first and second adjusting screws 44, 46, and the connection member 45 form a unit which can be pre-assembled before being mounted in the tool.

In addition to two openings for the adjusting screws 44 and 46, the connection member 45 has two further through-opening 47 of which only one can be seen in the drawing. The second through-opening 47 is located behind the first through-opening 47. The first sections of two bolt-shaped control members 53 extend through the two through-openings 47, respectively. The outer diameter of the first sections of the control members 53 correspond to the diameter of the through-openings 47. At their sides facing in the direction opposite to the operational direction, the first sections of the control members 53 are adjoined by second sections the diameter of which is greater than the diameter of the first sections. The length of the first sections of the control members 53, which is measured parallel to the operational direction, exceeds the width of the connection member 45 by a travel path of the adjusting element 62 of the valve 61. The control members 53 are fixedly connected with the connection member 45 and are surrounded each by a spring 54 which is supported against an end surface of the connection member 45, which faces in the direction opposite to the operational direction, and against the carrier member 5.

Below the drive-in process of the attachment element will be described.

The drawing shows an initial position of the screw-driving tool, with the drilling head of the attachment element 2 and the surface 41 of the second adjusting screw 46 engaging the surface of the constructional part 3.

For forming a through-hole in the constructional part 3, the attachment element is rotated, and the attachment element 2 penetrates into the constructional part 3, machining a hole therein. Simultaneously, the unit 4 is displaced in the direction opposite to the operational direction against the biasing force of the spring 54 by an amount corresponding to the displacement path of the adjusting element 62 of the valve 61. Thereby, the delivery of the cooling medium from the pressure vessel 6 to the operational side end region of the attachment element 2 is actuated. As a result, the drilling head of the attachment element 2 and the surface of the constructional part 3 in the working location are cooled, so that the drilling head does not become burnt, and the material of the constructional part 3 does not lose its mechanical properties.

After a through-hole in the constructional component has been formed, the attachment element 2 reaches the wooden constructional component 8 and is secured therein by being screwed-in. The constructional component 8 can also be formed of steel. In order to prevent the adjusting screws 44 and 46 from interfering with the further drive-in process, the pressure vessel 6 is displaced in the direction opposite to the operational direction against the biasing force of the spring 52. Because the stop surface 41 of the second adjusting screw 46 abuts the constructional part 3 during the entire drive-in or screw-in process, the position of the outlet of the delivery conduit 7 does not change. Therefore, the cooling medium delivered through the conduit 7 cools the threaded section of the attachment element 2 before it enters into the constructional part 3.

The adjusting screws 44, 46 control the point in time at which the valve 61 is actuated. E.g., the stop surface 41 of the second adjusting screw 46 can project beyond the operational side end of the drilling head of the attachment element 2 in the initial position of the tool. Thereby, the valve 61 can be actuated as soon as the tool is actuated so that the working head of the attachment element 2 will be cooled before the start of rotation of the attachment element 2. However, the stop surface 42 of the second adjusting screw 46 can be offset backward relative to the operational side end of the working head, so that delivery of the cooling medium is time-delayed with respect to the start of rotation of the attachment element 2.

It is also possible to provide means which would insure that the valve 61 will be actuated only for a period of time necessary for forming the through-hole in the constructional part 3.

In the pressure vessel 6, a chlorofluorocarbon-free cooling medium is stored. As a cooling medium, organic hydrocarbons, partially hologenated hydrocarbons, or inorganic hydrocarbons, such as $CO_2$ or $N_2O$, which liquify under pressure, can be used. The cooling of the attachment element 2 and of the surface of the constructional part 3 is effected with a latent heat of a phase transition, e.g., with heat of vaporization.

Though the present invention was shown and described with references to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A rotary tool for imparting rotation to a drill or an attachment element (2), comprising a drilling head, with an apparatus (6) for storing a cooling medium; conduit means (7) for delivering at least for a time the cooling medium to an operational side end region of the drill or of the attachment element (2); a valve (61) for controlling a cross-section of an outlet of the storing apparatus (6) control means cooperating with the valve; and a housing (1), wherein the control means is formed as a unit (4) displaceable against the housing (1) and against a biasing force of a spring (54) in a direction opposite an operational direction of the tool, the control unit (4) having a stop surface (41) facing in an operational direction of the tool and a control profile (42) cooperating with the valve (61).

2. A rotary tool according to claim 1, wherein the valve (61) has an adjusting element (62) for controlling the cross-section of the outlet of the storing apparatus and which is displaced by the control profile (42) by an angle from 0° to 90° with respect to the operational direction.

3. A rotary tool according to claim 1, wherein the storing apparatus (6) and the valve (61) form a unit.

4. A rotary tool according to claim 1, wherein the storing apparatus (6) is formed as a pressure vessel.

5. A rotary tool according to claim 1, wherein the storing apparatus (6) is releasably connected with a tool housing (1).

6. A rotary tool according to claim 1, wherein the delivering conduit (7) is formed at least partially by a flexible tubular conduit.

* * * * *